(12) United States Patent
Marola

(10) Patent No.: US 6,237,931 B1
(45) Date of Patent: May 29, 2001

(54) TOWBAR ADAPTER

(75) Inventor: Martin A. Marola, Goshen, CT (US)

(73) Assignee: Tru-Hitch, Inc., Torrington, CT (US)

( * ) Notice: Subject to any disclaimer, the term of this patent is extended or adjusted under 35 U.S.C. 154(b) by 0 days.

(21) Appl. No.: 09/232,952

(22) Filed: Jan. 18, 1999

(51) Int. Cl.$^7$ .................................................. B60P 3/07
(52) U.S. Cl. .................... 280/402; 280/407; 280/482; 410/7; 414/563; 414/664
(58) Field of Search ................... 410/7, 77, 80; 414/563, 664; 280/402, 490.1, 495, 500, 502, 505, 415.1, 416.1, 417.1, 416.2, 416.3, 407, 482

(56) References Cited

U.S. PATENT DOCUMENTS

| | | | |
|---|---|---|---|
| 4,640,660 | * | 2/1987 | Watson .................................. 414/563 |
| 5,090,718 | * | 2/1992 | Kauffman ............................. 280/402 |
| 5,249,911 | * | 10/1993 | Marola .................................. 414/563 |
| 5,413,366 | * | 5/1995 | Gibbons ............................ 280/490.1 |
| 5,722,677 | * | 3/1998 | Lichter et al. ........................ 280/402 |
| 5,765,850 | * | 6/1998 | Emerson ........................... 280/490.1 |
| 5,795,115 | * | 8/1998 | Collins ................................. 410/22 |
| 6,077,004 | * | 6/2000 | Denman, Jr. ............................. 410/8 |

FOREIGN PATENT DOCUMENTS

| | | | | |
|---|---|---|---|---|
| 2620128 | * | 11/1977 | (DE) .................................... 280/402 |
| 2250323 | * | 5/1975 | (FR) .................................... 280/402 |

* cited by examiner

Primary Examiner—Brian L. Johnson
Assistant Examiner—Avraham H. Lerner
(74) Attorney, Agent, or Firm—Alix, Yale & Ristas, LLP

(57) ABSTRACT

A towbar adapter assembly that attaches to a towbar boom and acts as a link between the towbar boom and a vehicle attachment point. The assembly has a base for attachment to the towbar boom and an anchoring strut that attaches to the vehicle. The base is incrementally positionable with respect to the towbar boom and the anchoring strut is incrementally positionable with respect to the base.

22 Claims, 5 Drawing Sheets

TOWBAR ADAPTER

BACKGROUND OF THE INVENTION

This invention relates generally to devices that are used for securing a vehicle to a towbar boom.

There are a number of devices which facilitate the towing of a vehicle behind another vehicle. The towing vehicle typically employs a towbar with at least one boom for lifting one end of the towed vehicle off the road surface. The towed vehicle is secured to the towbar boom by means of chains or similar devices. The use of chains to secure the towed vehicle to the towbar boom presents problems in finding a sufficient number of anchoring points to secure the towed vehicle to the towbar boom. In addition, the use of chains requires an operator to reach underneath the vehicle to be towed, which is time consuming and awkward in adverse conditions such as snow or rain storms.

SUMMARY OF THE INVENTION

The towbar adapter assembly includes two subassemblies. A receiver sub-assembly is comprised of a base and a body. The receiver base is adapted to be mounted onto a towbar boom and securely attached thereto, for instance, by bolts. The receiver body is attached to the base and projects upward and at a right angle from the base. The attachment position of the receiver body is offset from the centerline of the boom receiver base and towbar boom.

The towbar adapter assembly further comprises an anchoring strut subassembly. The strut is adapted to be slidably received by the receiver body and comprises at least one clevis. The vertical position of the strut with respect to the receiver body may be varied by sliding the strut up or down within the body. Once the desired strut vertical position is achieved, this position may be secured, for instance, with a pin.

The clevis comprises a set of parallel ears extending from the strut. Each ear has an aperture, which is axially aligned with an opposing aperture. The clevis has a centerline plane which is offset by a distance from the centerline plane of the strut. The vehicle tie ring is positioned between the parallel ears of the clevis and coupled thereto.

In use, the receiver base bolts are loosened and the towbar adapter assembly is removed from a storage mount. The receiver base is positioned onto the towbar boom to obtain the desired offset of the receiver body to the towbar boom. The receiver base is secured to the towbar boom. The strut is positioned with respect to the receiver base so that the desired vertical height and offset of the clevis to the base are achieved. The strut is secured to the receiver body to fix this position. The vehicle tie ring, or another similar fixture, is then positioned between the ears of the clevis and coupled thereto.

Preferably a pair of towbar adapter assemblies are used for securing the vehicle to the towbar. In this circumstance, the offset distance of each clevis to its base is independently variable. This allows the use of two towbar adapter assemblies of the same dimensional configuration to incrementally accommodate vehicles with an extended range of tie ring spacings.

An object of the invention is to provide a rapid and convenient means of adjustably securing a vehicle to a towbar boom via a vehicle tie ring.

A further object of the invention is to provide a high integrity attachment of a heavy-duty vehicle to a towbar boom.

Another object of the invention is to provide an efficient device capable of readily securing a wide range of vehicles having differing vehicle tie ring locations to a towbar boom.

BRIEF DESCRIPTION OF THE DRAWINGS

Other objects and advantages of the invention will be evident from the following detailed description made with reference to the accompanying drawings, in which.

DETAILED DESCRIPTION OF THE PREFERRED EMBODIMENTS

Briefly stated, in the preferred form, the present invention comprises a towbar adapter assembly for securely anchoring a vehicle tie ring to a towbar boom. The towbar boom may be any of a number of devices known in the art such as that described in U.S. Pat. No. 5,249,911 which is incorporated by reference herein.

Figure 1:
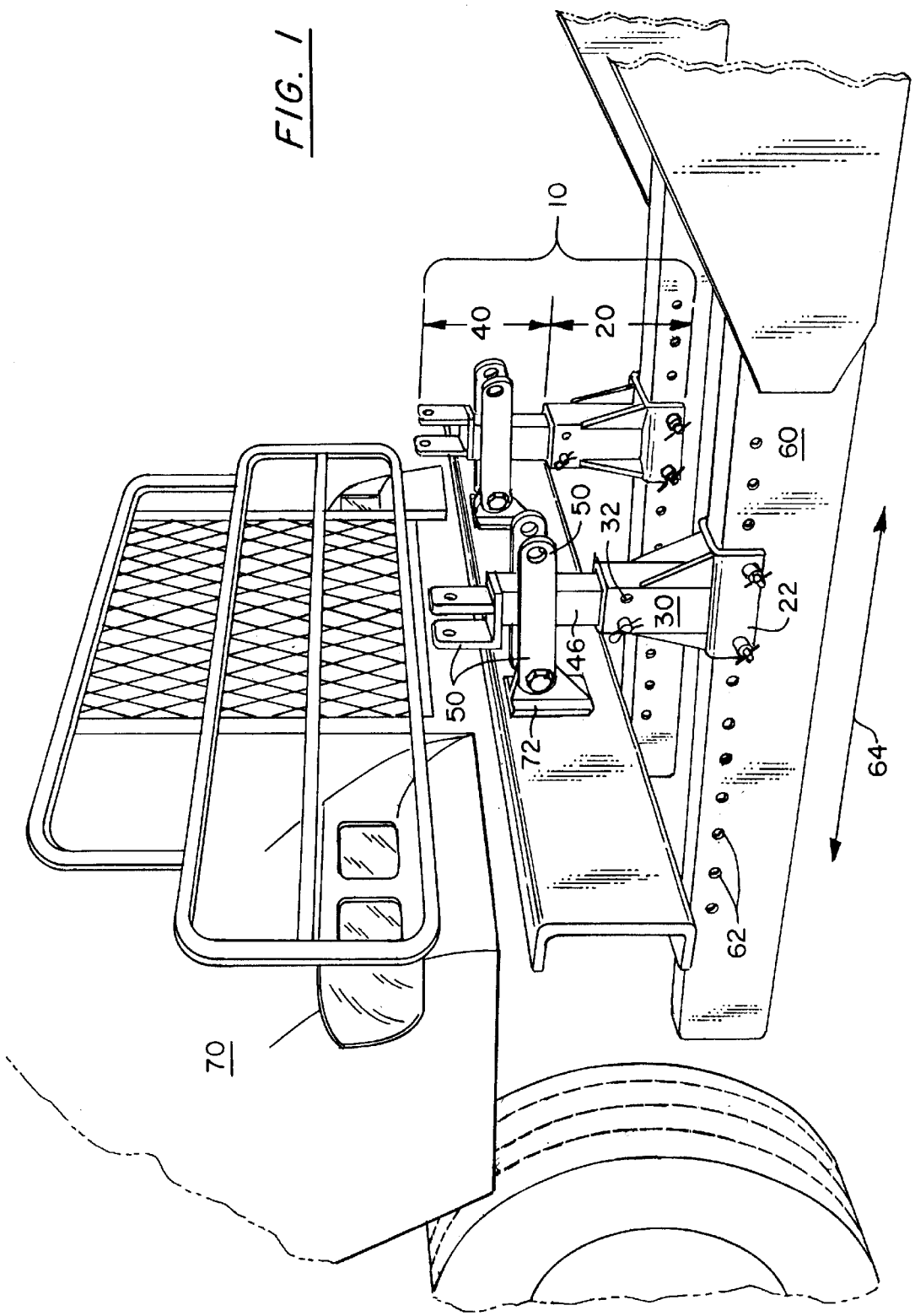
FIG. 1 is a perspective view of a heavy-duty vehicle (partially illustrated), attached to a towbar boom, (partially illustrated) by a pair of towbar adapters in accordance with the invention.
Figure 2:
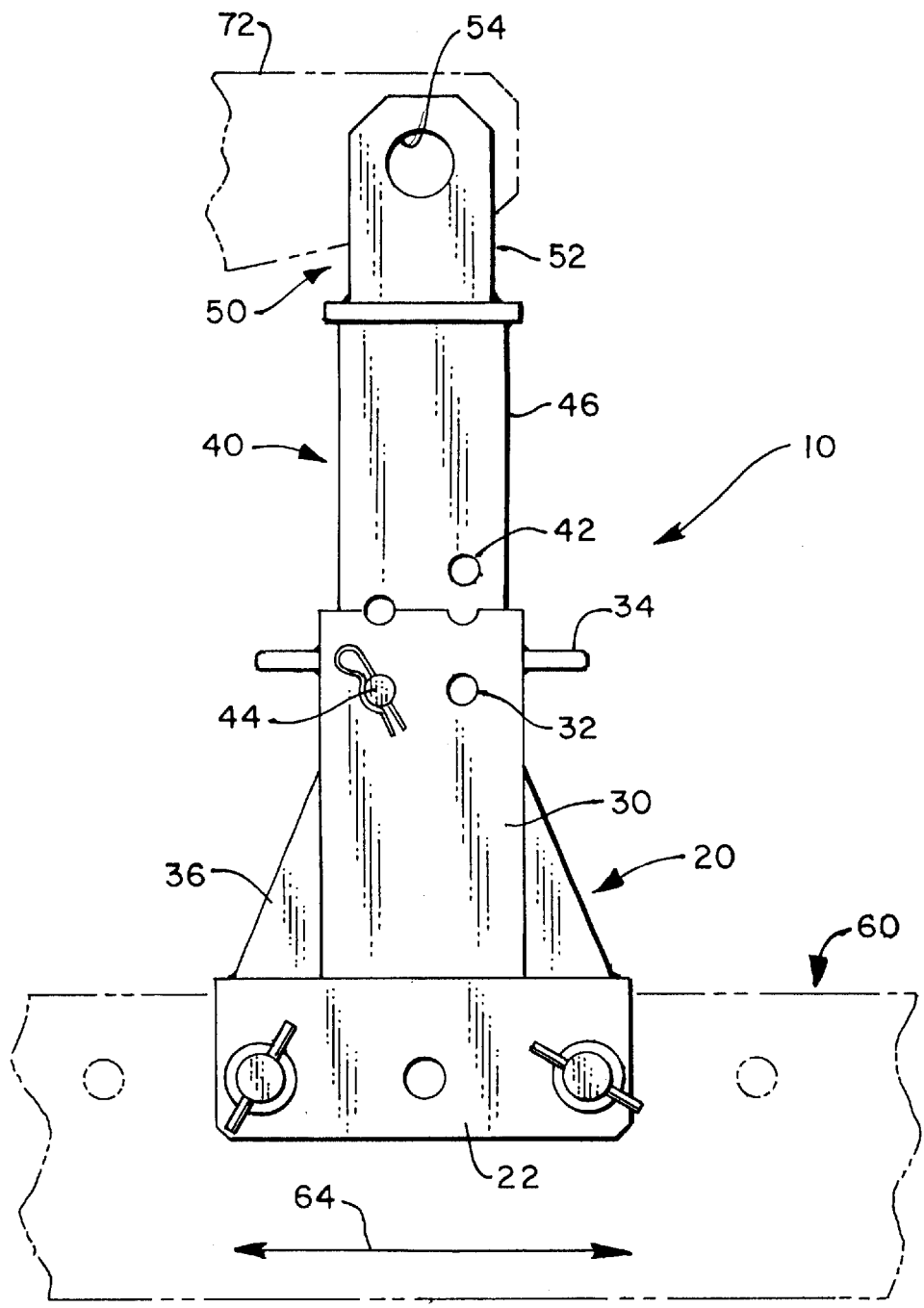
FIG. 2 is a side elevational view of a towbar adapter assembly showing attachment to a towbar boom (partially illustrated in phantom) and a vehicle tie ring.

With reference to the drawings wherein like reference numerals represent identical or corresponding parts throughout the Figures, a towbar adapter in accordance with the present invention is generally designated by the numeral 10. As shown in FIGS. 1 and 2, the towbar adapter assembly 10 is comprised of two subassemblies, a receiver subassembly 20 and an anchoring strut subassembly 40. Both receiver subassembly 20 and strut subassembly 40 are preferably manufactured from steel or other high strength materials and have a rugged heavy-duty construction. The receiver subassembly 20 has a receiver base 22 for mounting to a towbar boom 60 and a receiver body 30 which projects orthogonally from the base 22. The anchoring strut 46 has one end which is adapted to be adjustably received by, and secured to, the body 30, and an opposing second end which includes a clevis 50. The vehicle tie ring 72 fits within and is readily coupled to the clevis 50.

Figure 3:
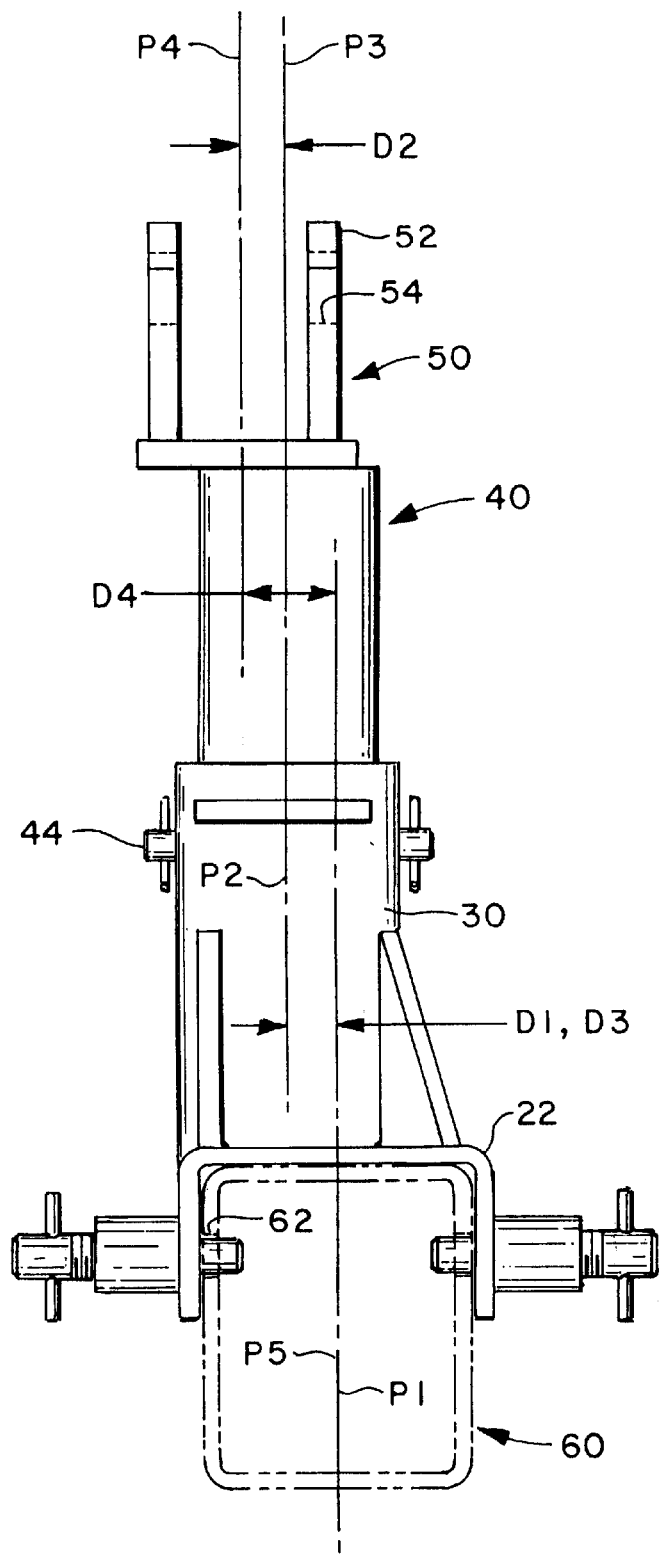
FIG. 3 is an end elevational view, partially in diagrammatic form, of the towbar adapter assembly of FIG. 2 mounted on a towbar boom (partially illustrated in phantom), further illustrating various geometric relations between the components.
Figure 4B:
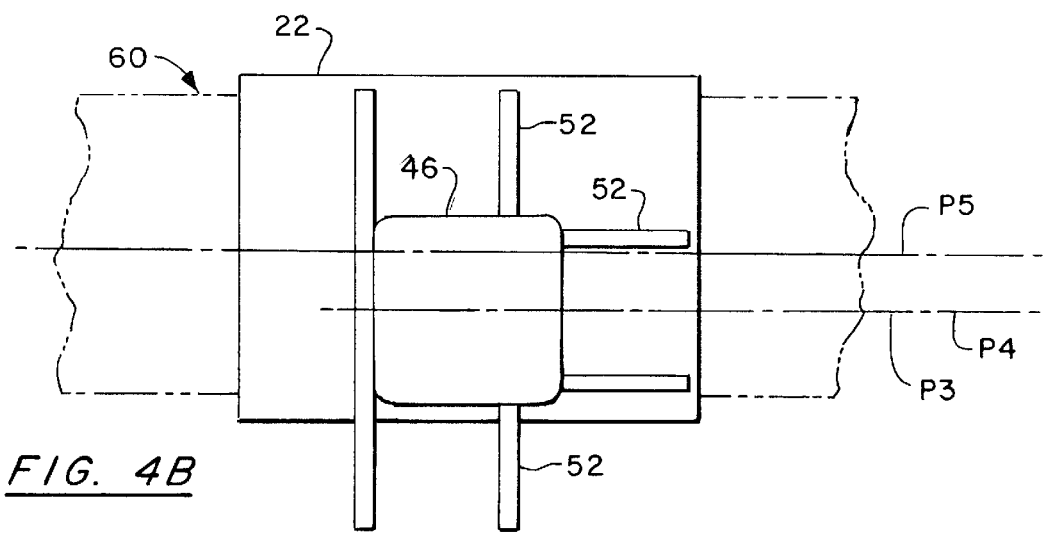
FIGS. 4A, 4B, and 4C are top, partially in diagrammatic form, views of various mounting configurations for the towbar adapter of FIG. 1, further illustrating various possible offset relationships.
Figure 4A:
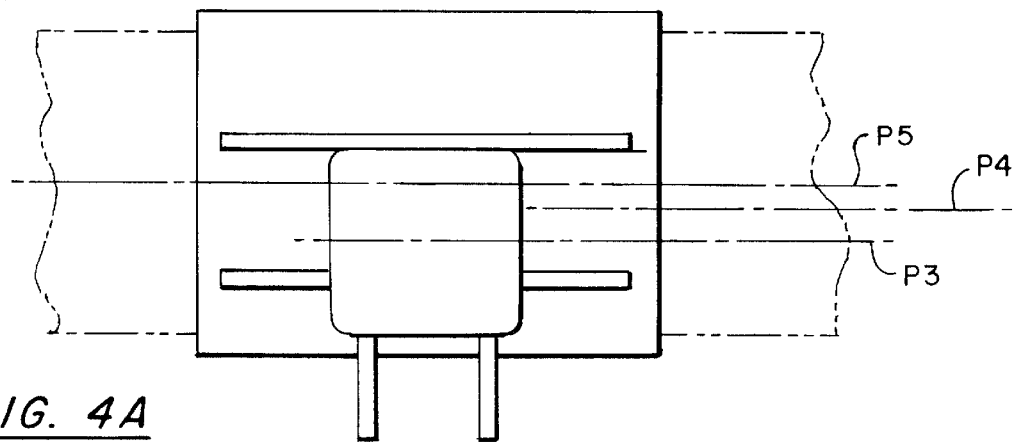
Figure 4C:
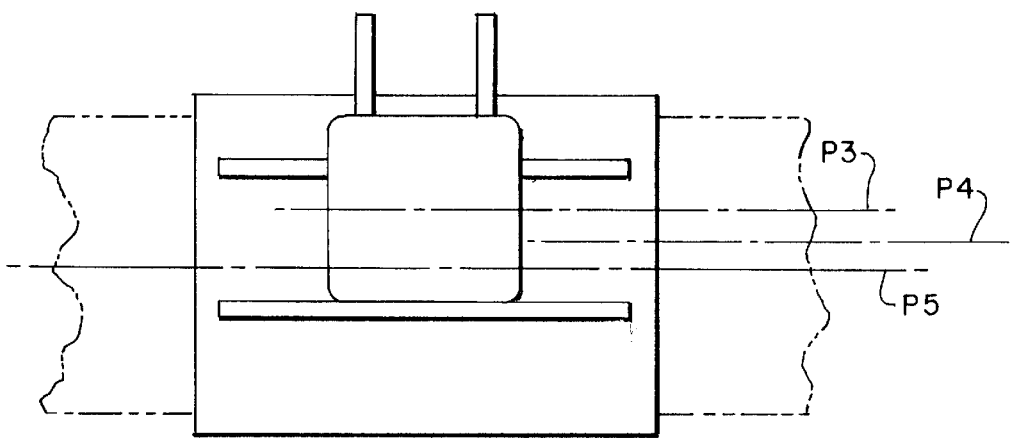

In a preferred embodiment shown in FIGS. 1 and 3, the receiver base 22 is comprised of a U-shaped member, with the parallel legs of the U-shaped member projecting downward. The legs form guides generally parallel to the towbar boom longitudinal direction 64 so that the towbar boom 60 fits within and slidably receives the U-shaped member. The invention may best be described with reference to various planes, as shown in FIGS. 3 and 4. The receiver base has a centerline plane P1 traversing through a centerline axis in the towbar boom longitudinal direction 64. The towbar boom centerline plane P5 is substantially the same as the base centerline plane P1. The receiver base 22 also has threaded bosses 24 in each of the parallel legs and screw pins 26. Upon suitable positioning of the base, the pins align with unthreaded apertures 62 in the boom. Each screw pin has a threaded shank which is screwed into the boss and an unthreaded tip which protrudes into the aperture in the boom to secure the base 22 to the towbar boom 60.

Alternatively, the screw pins could be replaced with bolts (not shown). Threading the bolt through the threaded boss 24 in a manner similar to the screw pin would allow the end of the bolt to enter the boom aperture 62, securing the receiver base 22 to the towbar boom 60. It can readily be seen that other securement hardware and methods could be used, such as pins engaging aligned apertures in the base and the towbar boom.

A receiver body 30 is attached at a lower first end to the receiver base 22 with the second end projecting upwardly from, and generally orthogonal to, the base. In the preferred embodiment, the receiver body 30 is made of steel tubing. The receiver body 30 has at least one pair of axially aligned apertures 32 disposed on opposing sides. The receiver body 30 has a centerline plane P2 (shown in FIG. 3) in the towbar boom longitudinal direction 64. In the preferred embodiment, this centerline plane P2 is offset from the centerline plane of the receiver base P1 by a distance D3 as shown in FIG. 3. In one embodiment, D3 is 1 inch.

The receiver subassembly 20 can embody a number of variations. One variation includes at least one gusset-like reinforcing member 36. In the embodiment shown in FIG. 2, a plurality of reinforcing members 36 are made of steel or another high strength material. The reinforcing members 36 are securely attached to both the receiver base 22 and receiver body 30, preferably by welding.

In another variation, the receiver body 30 further includes a handle 34 to make it easier to move the towbar adapter assembly. The handle 34 can be vertically (not shown) or horizontally disposed on the receiver body. The handle 34 is preferably rigid formed of steel, and welded to the receiver body.

The anchoring strut subassembly 40 has a lower first end which is adapted to be slidably received by the receiver body 30 and an upper second end which comprises at least one clevis 50. An anchoring strut centerline plane P3 (shown in FIG. 3) intersects the first and second ends parallel to the towbar boom longitudinal direction 64. In the preferred embodiment, the strut 46 is made of steel tubing, which can be slidably received within the tubing comprising the receiver body 30. The strut has a plurality of two sets of opposing axially aligned apertures 42, shown in FIG. 2, which generally extend from the first end to the second end.

In this embodiment, the strut subassembly 40 is vertically positioned within the receiver body 30 and a pin 44 is engaged through the aligned apertures of the receiver body 32 and strut 42 to fix that vertical position. Naturally, the securing of the strut 46 to the receiver body 30 could be accomplished by a variety of other means, for instance, bolts could be inserted through the aligned and unthreaded apertures with a nut locking the bolt in place. Alternatively, the apertures could be threaded and bolts screwed through the apertures.

The clevis 50, shown in FIGS. 2 and 3, is comprised of a set of parallel ears 52, extending from the support strut 46. Each ear 52 has an aperture 54 that is axially aligned with an opposing aperture. In a preferred embodiment, the clevis centerline plane P4 is parallel to the towbar boom longitudinal direction 64 and offset from the strut centerline plane P3, by a distance D2, as shown in FIG. 3.

In another preferred embodiment, shown in FIGS. 1 and 4, the strut 46 is rotatably and slidably receivable by the receiver body 30, and the strut upper second end has three devises 50. Each clevis 50 extends from the strut 46 in a different right angle orientation. Rotation of the strut 46 with respect to the receiver body 30 provides a choice of a given clevis 50. Each clevis centerline plane P4 is offset from the strut centerline plane P3 by a different distance D2. Rotation of the strut 46 allows an incremental choice of the offset distance D2 of the clevis centerline plane P4 to the strut centerline plane P3 and of the offset distance D4 of the clevis centerline plane P4 to the towbar boom centerline plane P5. In one embodiment, D2 ranges from 1 to 2 inches. The choice of clevis used corresponds to a given dimensional requirement presented by the vehicle 70. In this embodiment, the strut first end is secured to the receiver body 30 to fix the radial direction and vertical height. This embodiment allows a single towbar adapter design to incrementally implement a wide range of offset distances D4 of the clevis centerline plane P4 to the towbar boom centerline plane P5, as shown in FIG. 4.

Figure 5B:
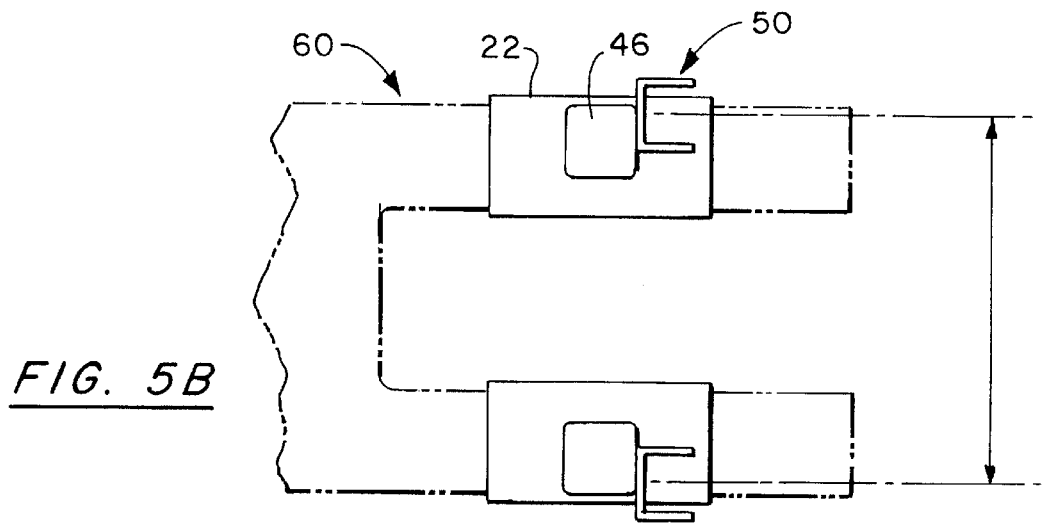
FIGS. 5A and 5B are schematic top views of two towbar booms (partially illustrated in phantom), each mounting a pair of towbar adapter assemblies and further illustrating the range of vehicle securing device spacings possible using a pair of the towbar adapter assemblies.
Figure 5A:
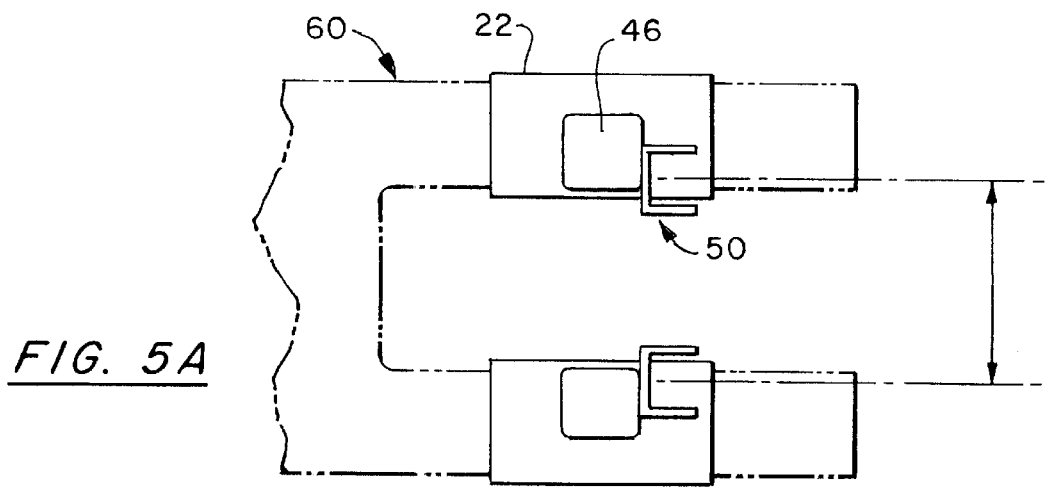

The more common usage will be to use a pair of towbar adapters to secure a vehicle to a towbar. Each towbar adapter is positionable on a towbar boom independently of the other. By varying the offset distance of the body to the towbar boom D3 and/or the offset distance of the clevis to the body D2, for either or both towbar adapters, a wide range of vehicle tie ring spacings to be accommodated. FIGS. 5A and 5B schematically show the closest and most distant clevis positions. Naturally, a number of intermediate clevis positions can also be provided.

As shown in FIG. 1, a vehicle tie ring 72 is positioned between the ears of the clevis 50. A pin is inserted through the aligned apertures in the ears 52 and the vehicle tie ring 72 to secure the vehicle 70 to the clevis 50 and ultimately to the boom.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A towbar adapter assembly for securing a vehicle having a tie ring to a towbar boom, comprising:

a receiver subassembly comprising a base having a centerline plane P1 and defining a mounting shoulder and a body comprising a first end attached to said base and an opposing second end, said body having a centerline plane P2 and a central longitudinal axis, both said centerline plane P2 and central axis projecting generally orthogonally relative to said shoulder;

first securement means for securing said base to said towbar boom, said base securable in at least two angular orientations with respect to said tow bar boom;

an anchoring strut having opposing first and second end portions and defining a centerline plane P3 therethrough, said first end portion being received by said body in an axially slidable relationship thereto, said strut being receivable by said body in at least two angular orientations thereto and at least one clevis having a centerline plane P4 mounted to said second end portion;

second securement means for securing said anchoring strut to said body at a selected angular orientation and axial position relative to said body; and coupling means for coupling said at least one clevis to said vehicle tie ring, wherein said body centerline plane P2 is offset by a first distance from said base centerline P1 and said clevis centerline plane P4 is offset by a second distance from said strut centerline plane P3 and said at least one clevis is securable in any one of a plurality of axial and rotational positions with respect to said towbar boom, whereby said clevis centerline plane P4 can be offset from either side of said base centerline plane P1 by a distance equal to the sum of said first and second distances.

2. A towbar adapter assembly for as in claim 1, wherein:

said towbar boom defines at least one aperture, said base defines at least one aperture, and said first securement means comprises at least one pin positionable within said base and said towbar boom apertures.

3. A towbar adapter assembly as in claim 1, wherein:

said body defines at least one pair of aligned apertures, said strut defines at least one pair of aligned apertures, and said second securement means comprises at least one pin positionable within one said pair of receiver body aligned apertures and one said pair of anchoring strut aligned apertures.

4. A towbar adapter assembly as in claim 1, wherein:

said clevis comprises clevis aperture means for defining at least one pair of aligned apertures and a pin insertable between said clevis aperture means and a vehicle tie ring.

5. A towbar adapter assembly as in claim 1, wherein:

said towbar boom defines at least one aperture, said base defines at least one threaded boss, and said first securement means comprises at least one screw threadedly interconnected with said boss and adapted to extend within one said towbar boom aperture;

said body defines at least one pair of aligned apertures, said strut defines at least one pair of aligned apertures, and said second securement means comprises at least one pin positionable within one said pair of receiver body aligned apertures and one said pair of anchoring strut aligned apertures; and said clevis comprises means defining at least one pair of aligned apertures and a pin insertable between said clevis aperture means and a vehicle tie ring.

6. A towbar adapter assembly as in claim 1, wherein said receiver body includes at least one handle.

7. A towbar adapter assembly as in claim 1, wherein at least one reinforcing member is disposed between said receiver base and said receiver body.

8. A towbar adapter assembly as in claim 1, wherein said anchoring strut is slidably received by said receiver body at a plurality of fixed angular positions.

9. A towbar adapter assembly as in claim 8, wherein:

said body centerline plane P2 is offset from said base centerline plane P1 by a distance of 1 inch; and said clevis centerline plane P4 is offset from said anchoring strut centerline plane P3 by a distance ranging from 1 inch to 2 inches.

10. A towbar adapter assembly, comprising:

a boom receiver subassembly comprising a base and a body;

said base comprising a U-shaped member with a centerline plane P1 and a mounting surface defined by a parallel pair of legs projecting downward from said U-shaped member and a web joining each leg;

said body comprising a first end attached to said base, an opposing second end projecting orthogonally upward from said base, said body defining a centerline plane P2 and at least one pair of aligned apertures;

an anchoring strut having a first end slidably positionable relative to said receiver body and a second end comprising at least one clevis with a centerline plane P4, said strut defining at least one pair of aligned apertures and a centerline plane P3; and at least one pin positionable within one said pair of receiver body apertures and one said pair of strut apertures;

wherein, said body centerline plane P2 is offset by a first distance from said base centerline plane P1 and at least one said clevis centerline plane P4 is offset by a second distance from said strut centerline plane P3.

11. A towbar adapter assembly as in claim 10, wherein said U-shaped member parallel legs each define at least one aperture in axial alignment with the other aperture.

12. A towbar adapter assembly as in claim 10, wherein:

said U-shaped member parallel legs have at least one threaded boss, and at least one screw is threadedly interconnected with a said boss.

13. A towbar adapter assembly as in claim 10, wherein said receiver body includes at least one handle.

14. A towbar adapter assembly as in claim 10, wherein at least one reinforcing member is disposed between said boom receiver base and said receiver body.

15. A towbar adapter assembly as in claim 10, wherein said anchoring strut is slidably received by said receiver body at a plurality of fixed angular positions.

16. A towbar adapter assembly as in claim 10, wherein said body and said anchoring strut are comprised of metal tubing.

17. A towbar adapter installation, comprising:

a vehicle having at least one vehicle tie ring;

a towbar boom having a centerline plane;

a receiver comprising a base and a body;

said base comprising a U-shaped member with a parallel pair of projecting legs, a connecting web, and a centerline plane P1;

said U-shaped member being slidably received over said towbar boom;

said receiver body comprising a first end attached to said base, a second end projecting generally orthogonally upward from said base, and a centerline plane P2, said body defining at least one pair of aligned apertures;

an anchoring strut having a first end slidably positionable relative to said boom receiver body and a second end comprising at least one clevis, said strut defining at least one pair of aligned apertures and a centerline plane P3;

at least one pin positionable within one said pair of receiver body apertures and one said pair of anchoring strut aligned apertures;

each said clevis comprising a pair of parallel ears each defining an aperture aligned with the other, said clevis having a centerline plane P4;

said tie ring being positionable between said clevis ears; and at least one pin insertable between said clevis ears and said vehicle tie ring.

18. A towbar adapter installation as in claim 17, wherein:

said body centerline plane P2 is offset by a first distance from said towbar boom centerline plane P5; and at least one said clevis centerline plane P4 is offset by a second distance from said anchoring strut centerline plane P3.

19. A towbar adapter installation as in claim 17, wherein:

said U-shaped member parallel legs define at least one pair of aligned apertures;

said towbar boom defines at least one pair of aligned apertures; and at least one pin is positionable within one said pair of U-shaped member apertures and one said pair of towbar boom apertures.

20. A towbar adapter installation as in claim 17, wherein:

said U-shaped member parallel legs have at least one threaded boss;

said towbar boom defines at least one aperture; and at least one screw is threadedly interconnected with one said boss and insertable with one said aperture.

21. A towbar adapter installation as in claim 17, wherein at least one reinforcing member is disposed between said base and said receiver body.

22. A towbar adapter installation as in claim 17, wherein said anchoring strut is slidably received by said receiver body at a plurality of fixed angular positions.

* * * * *